No. 809,091. PATENTED JAN. 2, 1906.
W. S. CAIN.
COMPUTING MEASURING VESSEL.
APPLICATION FILED MAY 11, 1905.
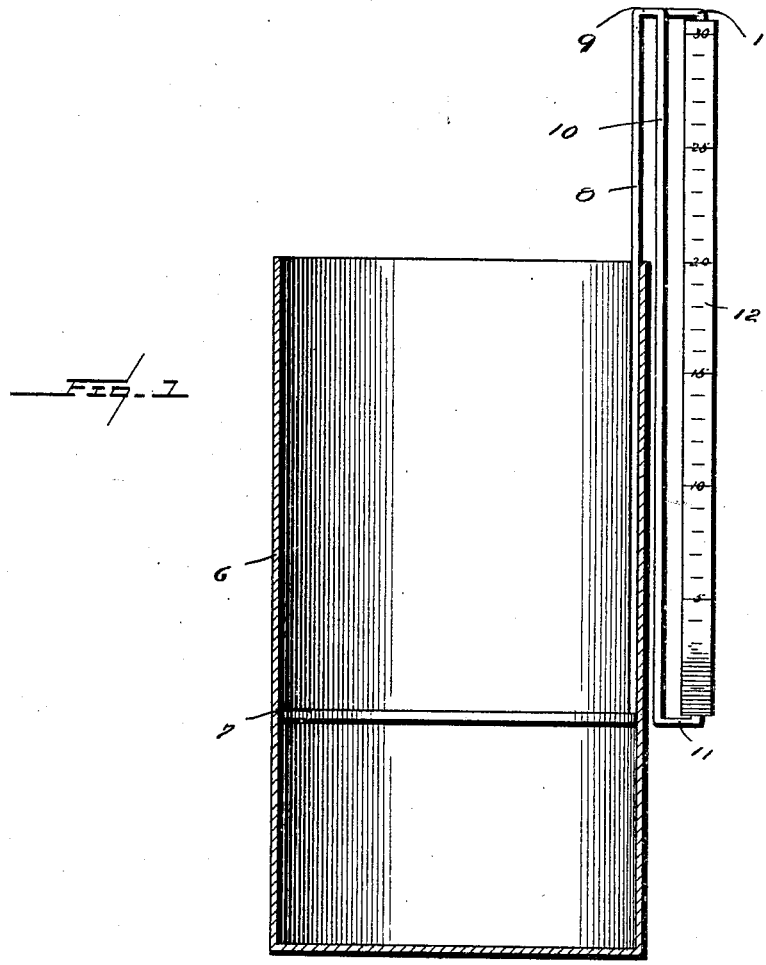
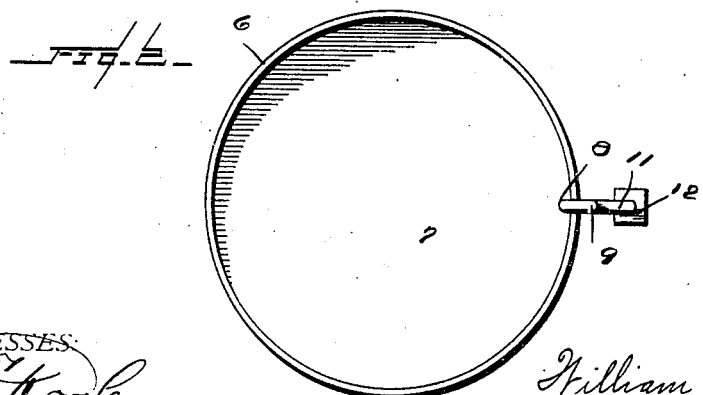
WITNESSES:
W. F. Koyle
Geo. E. Few
INVENTOR
William S. Cain,
BY Milo B. Stevens & Co.
Attorneys.

UNITED STATES PATENT OFFICE.

WILLIAM S. CAIN, OF CHICAGO, ILLINOIS.

COMPUTING MEASURING VESSEL.

No. 809,091.  Specification of Letters Patent.  Patented Jan. 2, 1906.

Application filed May 11, 1905. Serial No. 260,003.

*To all whom it may concern:*

Be it known that I, WILLIAM S. CAIN, a citizen of the United States, residing at Chicago, in the county of Cook and State of Illinois, have invented new and useful Improvements in Computing Measuring Vessels, of which the following is a specification.

This invention is a computing measuring vessel particularly adapted for use as a dry measure and designed to give the price for the amount of material measured.

It comprises a cylindrical vessel—say a peck or bushel measure—having a false bottom which is connected to a price-scale extending down beside the vessel and movable with the false bottom to indicate the amount to be delivered at a certain price less than the price for the whole capacity of the vessel.

The invention is illustrated in the accompanying drawings, Figure 1 being a vertical section thereof, and Fig. 2 a plan view.

Referring specifically to the drawings, 6 indicates a cylindrical measuring vessel. This has a false bottom 7, which is connected at the edge to a rod 8, which extends above the top of the vessel and by taking hold thereof may be moved up and down in the vessel to vary its depth, and consequently its capacity. The rod is held by hand while the material is being measured. The rod 8 is folded at the top, as at 9, and continues down on the outside of the measure, as at 10, a distance equal to the depth of the measure. Projecting from the rod 10 are arms 11, which support a rotatable bar 12, containing a series of price-scales. These scales run from the bottom to the top of the bar and indicate by the marks thereon the price for various fractional capacities of the measure compared to the total price for the whole capacity. The scales may be made to differ as desired, and the bar is rotatable, so that any desired scale may be turned to the front. Although shown as square, obviously the bar may be made round or of any other cross-section and varied in size, so that any desired number of price-scales may be placed thereon. The length of the bar is equal to the depth of the vessel. Consequently divisions on the scale indicate the relative capacities as adjusted by the false bottom 7.

In use say it is desired to give twenty cents' worth of some merchandise or produce at thirty cents per peck. The rod 8 and the bottom 7 are lifted until the figures "20" on the scale headed with "30" are even with the top of the vessel, which will then measure twenty cents' worth of the goods. Furthermore, the price-scale on the bar may be used to indicate fractions of the whole measure. Thus if the measure be a peck it will be seen that on the bar headed "30" the mark "15" will indicate half a peck, and so with the other fractions, or one side of the bar may have thereon a small scale of the fractional parts of the measure, so that the false bottom can be readily set to any desired capacity, and this being given the bar may be turned to show the amount of the price for such fractional part of the whole.

What I claim as new, and desire to secure by Letters Patent, is—

1. The combination with a measuring vessel, of a false bottom which may be raised or lowered therein, a rod connected and movable with the bottom and extending up above the upper edge of the vessel and down beside the wall thereof, on the outside thereof, and a price-scale bar carried by said rod.

2. The combination with a measuring vessel, of a false bottom which may be raised or lowered therein, a rotatable scale-bar, having a plurality of scales, extending beside the wall of the vessel, on the outside thereof, and movable with said bottom, and a rod connecting the scale-bar and bottom.

In testimony whereof I have signed my name to this specification in the presence of two subscribing witnesses.

WILLIAM S. CAIN.

Witnesses:
 H. G. BATCHELOR,
 NELLIE CAIN.